United States Patent [19]

Wesch

[11] 4,014,147
[45] Mar. 29, 1977

[54] HEAT-INSULATING CONSTRUCTION ELEMENT FOR REINFORCING DOUBLE-WALLED PRESSURE TANKS

[76] Inventor: Ludwig Wesch, Goerrestr. 54, 6900 Heidelberg, Germany

[22] Filed: Mar. 31, 1976

[21] Appl. No.: 672,057

[30] Foreign Application Priority Data

Apr. 2, 1975 France .................... 75.10232

[52] U.S. Cl. ................... 52/249; 52/309.1; 52/508; 220/9 LG; 428/35; 428/119; 428/255; 428/116
[51] Int. Cl.² .......................... E04B 1/74
[58] Field of Search ........... 52/249, 267, 309, 249, 52/615; 428/35, 36, 255, 119, 120, 116; 220/9 LG

[56] References Cited

UNITED STATES PATENTS

| 2,477,852 | 8/1949 | Bacon | 52/615 X |
| 2,538,330 | 1/1951 | Rosenhagen | 428/116 |
| 2,633,439 | 3/1953 | Konstandt | 428/116 |
| 3,298,152 | 1/1967 | Lockshaw | 52/309 X |
| 3,338,010 | 8/1967 | Waugh | 52/274 X |
| 3,769,126 | 10/1973 | Kolek | 428/36 |

FOREIGN PATENTS OR APPLICATIONS 506,017  5/1971  Switzerland .............. 428/116

Primary Examiner—Alfred C. Perham

[57] ABSTRACT

A heat-insulating construction element adapted to be interposed between two substantially parallel walls of a low temperature, high pressure fluid-containing vessel to maintain the walls a predetermined distance apart. The element has a perforated tubular body formed of a winding of heat-insulating filamentary material reinforced by a cured resin, and an annular element forming an end abutment for the body attached to each end of the body.

9 Claims, 3 Drawing Figures

Fig. 1

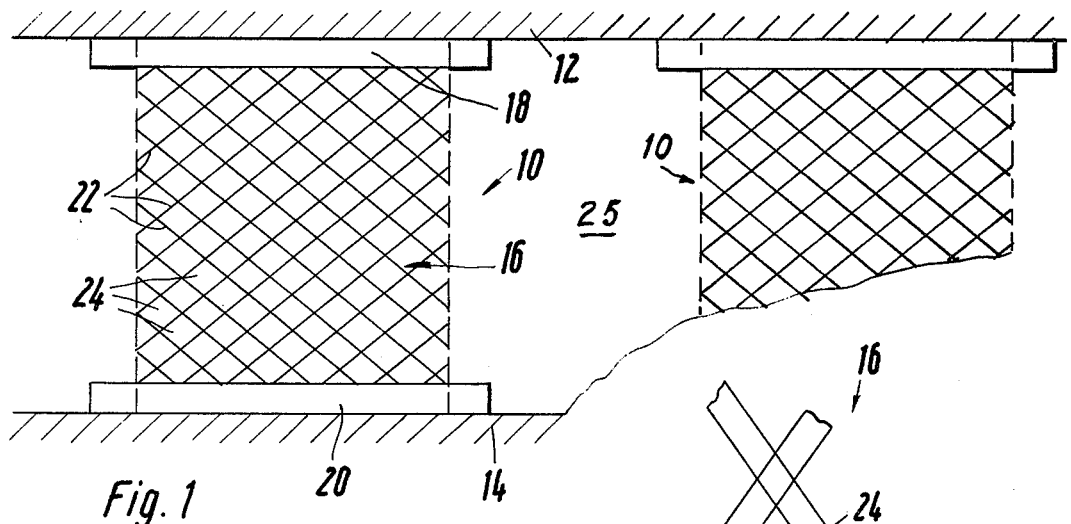
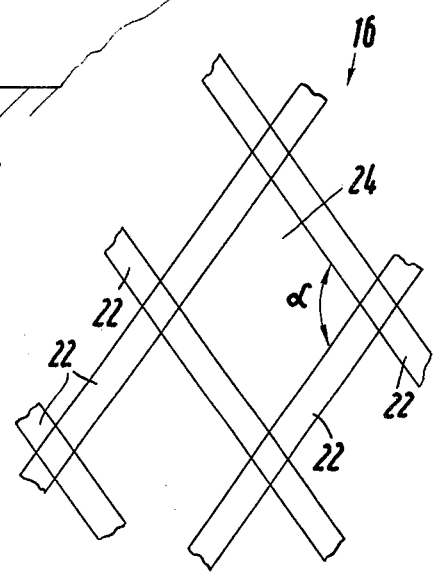
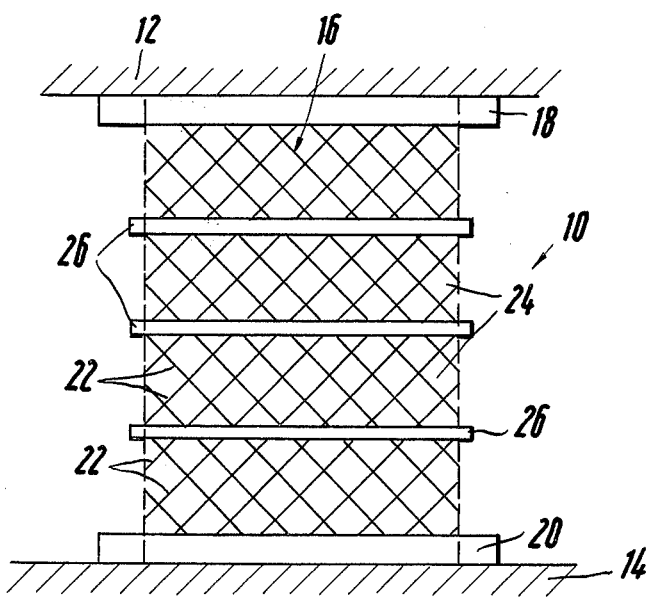

HEAT-INSULATING CONSTRUCTION ELEMENT FOR REINFORCING DOUBLE-WALLED PRESSURE TANKS

The present invention relates to a heat-insulating construction element adapted to be interposed between two substantially parallel walls of a low temperature, high pressure fluid-containing tank to maintain the walls a predetermined distance apart.

In known double-walled tanks for containing liquid gas at low and very low temperatures, the heat insulation between the two walls is often secured with the aid of glass wool or plastic foam interposed between the two walls of the tank.

Such construction presents difficulties, particularly when the tank is mounted in a tank ship for transporting gases in liquid form. In such cases the tanks are usually cubic in shape, and the means provided between the tanks and the bulwarks of the ship must not only maintain the positioning and the heat insulation of the tanks, but also must absorb the forces imposed upon them by the bulwarks because of the movement of the sea. Furthermore, the heat insulation means must also support the weight of the tank. Up to now it has been endeavored to absorb the tension, compression, and shearing forces which thus arise by filling all of the space between the tank and the bulwark by balsa wood.

The present invention has among its objects the elimination of the necessity for filling the space between the two walls with balsa wood. In accordance with the invention there are inserted between the tank and the bulwark or other enclosing structure novel construction elements which are particularly capable of absorbing tension and pressure forces transmitted between the walls, that is, between the wall of the tank and that of the enclosing structure, such construction elements being interposed between the two walls, the remaining space between the two walls being filled with heat-insulating material such as a foam of plastic material.

More precisely, the construction element of the invention has a tubular body formed by winding a reinforced heat-insulating filamentary material, there being an annular element functioning as an abutment attached to each end of the body.

In one preferred embodiment, the wound tubular body is produced by crossed helicoidal windings of the reinforcing filaments, said filaments being impregnated by a hardenable plastic material.

The invention also includes a heat-insulated tank comprising an interior tank, an exterior tank, and heat-insulating and tank wall-positioning means inserted between the two tanks, such means being constituted by a plurality of construction elements of the type described immediately above and by heat-insulating packing material disposed between the two tanks.

The invention will be more readily understood upon consideration of the following description and of the accompanying drawings showing preferred embodiments of the invention.

In the drawings:

FIG. 1 is a schematic view in side elevation of a first embodiment of construction element in accordance with the invention;

FIG. 2 is a fragmentary view in side elevation on a large scale of the body of the construction element of FIG. 1; and FIG. 3 is a schematic view in side elevation of a second embodiment of the reinforced construction element according to the invention.

Turning now to FIG. 1, there is shown two construction elements 10 adapted to be inserted between two substantially parallel walls 12 and 14 of a double-walled heat-insulating tank or the like, such elements 10 maintaining a predetermined distance between the walls while the inner wall is subjected to very low temperatures and high internal pressures. It is to be understood that, although the wall 12 may be that of an interior tank and the wall 14 may be that of an exterior tank surrounding the interior tank, the wall 14 may be that of another, restraining structure, such as the bulwark of a ship. It is also to be understood that, although only two elements 10 are shown in FIG. 1, as many of such elements are employed between the two opposing substantially parallel walls as are necessary to maintain their parallelism despite the arduous conditions under which they operate. The heat-insulating and wall-positioning means employed between the walls 12 and 14 further includes a heat-insulating filling 25, such as heat-insulating plastic foam, which fills the space between and within the reinforcing elements 10.

The construction elements 10 are composed essentially of a tubular wound body 16, formed as explained above, made of reinforced heat-insulating material and two annular elements 18 and 20 affixed to the respective ends of the body 16 to serve as abutments contacting the walls 12 and 14, respectively.

The body 16 is made in accordance with a known technique by crossed helicoidal winding upon a mandrel (not shown) having an appropriate shape of reinforcing filaments 22 impregnated with a hardenable plastic material. The winding is conducted in such manner as to provide between the layers of filaments apertures 24 in the form of diamonds. The angle $\alpha$ at which successive layers of filaments 22 cross each other (see FIG. 2) preferably lies between 45° and 150° depending upon the forces and pressures to which the element 10 is to be subjected.

As reinforcing filaments 22 there may be employed fibers of glass, asbestos, iron, carbon, graphite and ceramic or any other metallic or organic fibers or their mixtures, such fibers having the requisite strength and other necessary mechanical and chemical properties. Preferably the fibers have a diameter less than 20 microns.

The hardenable plastic material may be, for example, an unsaturated polyester resin. It is to be understood that one may also employ any other suitable hardenable plastic material, by preference there being employed polyester resins, epoxy resins, and phenol resins with corresponding additives.

Each of the annular abutment elements 18 and 20 may advantageously be made of hardenable plastic material. It may be prefabricated in the form of a ring having predetermined dimensions (thickness, diameter) upon which there is provided a circular shoulder so that it may be affixed, as by the use of a suitable adhesive, to the corresponding end of the body 16.

The elements 18 and 20, however, may also be formed in situ upon the ends of the body 16 by being molded thereon. In such case, it is preferred that the body 16 have the same diameter as that of the abutment ring molded thereon.

The compressive strength of the plastic material which composes the elements 18 and 20 may be increased by incorporating therein known additives such as powdered quartz and/or cast or extruded fibers.

It is to be understood that the form of the abutments on the ends of the body 16 may be changed when necessitated by the shape of the walls 12 and 14. Thus the abutments in some cases may have various other geometrical shapes such as semi-spherical or cap-like shapes.

In one construction, which is exemplary only, the reinforcing elements 10 shown in FIG. 1 have a length of 60 cm and a diameter of 20 cm, the crossing angle $\alpha$ being 60°, the distance between parallel wound layers being 2 cm. With such construction the elements 10 is able to sustain a compressive force of 1.5 metric tons without failure.

In FIG. 3 there is shown a further embodiment of reinforcing element in accordance with the invention. In this construction the body 16 of the element is reinforced at zones spaced along its length by reinforcing rings 26. Such rings prevent the wound walls of the reinforcing element from being distorted outwardly under the effect of high compressive forces directed longitudinally of the element.

Reinforcing rings 26 are preferably provided by winding reinforcing filaments impregnated with a hardenable plastic material about the body 16 at intervals spaced therealong. The elements forming the reinforcing rings 16 may be fixed chemically upon the body 16, that is to say, the plastic materials which impregnate the fibers forming the body 16 and that impregnating the filaments which form the reinforcements 26 are polymerized together.

The thermal conductivity of the elements 10 of the invention is of the same order as that of light polyurethane foams which may be employed as the heat-insulating material 25 shown in FIG. 1.

The employment of elements of construction 10 for all double-walled tanks and for all gas transporting ships represents a large technical improvement because it permits the absorption of high mechanical forces while entailing only a small conduction of heat between the two walls. Further, the reinforcing element 10 may be readily made by a simple method of fabrication and at a very reasonable cost.

It is to be understood that the invention may be employed in a number of different manners. Thus it may be employed with ships transporting liquid gas, and may be also employed for other gas-transporting or storing tanks wherein cold products must be maintained with a minimum of heat transmission thereto.

Although the invention is illustrated and described with reference to a plurality of preferred embodiments thereof, it is to be expressly understood that it is in no way limited by the disclosure of such a plurality of embodiments, but is capable of numerous modifications within the scope of the appended claims.

What is claimed is:

1. A heat-insulating construction element adapted to be interposed between two substantially parallel walls to maintain them a predetermined distance apart, said element having a perforated tubular body formed of a winding of heat-insulating filamentary material reinforced by a cured resin, and an annular element forming an end abutment for the body attached to each end of the body.

2. A heat-insulating construction element according to claim 1, wherein the wound tubular body is obtained by the crossed helicoidal winding of reinforcing filaments impregnated with a hardenable plastic material.

3. A heat-insulating construction element according to claim 2, wherein the crossing angle of the filaments lies between 45° and 150°.

4. A heat-insulating construction element according to claim 1, wherein each annular abutment elements is formed of hardenable plastic material.

5. A heat-insulating construction element according to claim 4, wherein particulate reinforcing material is distributed throughout the hardenable plastic material which forms the annular abutment elements.

6. A heat-insulating construction element according to claim 1, comprising at least one supplementary reinforcement disposed about the body of the element intermediate the length thereof, such supplementary element being formed by winding reinforcing filaments impregnated with hardenable plastic material about the body of the construction element.

7. A heat-insulating construction element according to claim 1, wherein the reinforcing filaments are chosen from a group consisting of glass fibers, asbestos fibers, metallic fibers, carbon fibers, graphite fibers, ceramic fibers, organic fibers, and mixtures of the above fibers, the diameter of such fibers being less than 20 microns.

8. A heat-insulating reservoir comprising a tank, an exterior, tank-enclosing structure, and means interposed between the outer wall of the tank and said structure for heat-insulating the two from each other and for securing the tank in place with respect to the outer wall, the tank and its enclosing structure having two spaced substantially parallel walls, a plurality of heat-insulating construction elements interposed between said two parallel walls to maintain them a predetermined distance apart, each of said construction elements having a perforated tubular wall formed of a winding of heat-insulating filamentary material reinforced by a cured resin, and an annular element forming an end abutment for the body attached to each end of the body, and a heat-insulating packing filling the space presented between the two substantially parallel walls and within the construction elements.

9. A reservoir according to claim 8, wherein the outer structure is an outer tank which has a shape substantially similar to that of the first-recited, inner tank, and wherein a plurality of construction elements are disposed between each pair of substantially parallel walls of the respective inner and outer tanks.

* * * * *